US008608957B2

(12) United States Patent
Burgstaler et al.

(10) Patent No.: US 8,608,957 B2
(45) Date of Patent: Dec. 17, 2013

(54) OIL TANK

(75) Inventors: Andree Burgstaler, Stemwede (DE); Dieter Groeger, Damme (DE); Uwe Renner, Lohne (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 134 days.

(21) Appl. No.: 13/254,406

(22) PCT Filed: Mar. 8, 2010

(86) PCT No.: PCT/DE2010/050008
§ 371 (c)(1), (2), (4) Date: Sep. 1, 2011

(87) PCT Pub. No.: WO2010/102616
PCT Pub. Date: Sep. 16, 2010

(65) Prior Publication Data

US 2011/0315573 A1 Dec. 29, 2011

(30) Foreign Application Priority Data

Mar. 11, 2009 (DE) ........................ 10 2009 001 460

(51) Int. Cl.
*F01M 11/03* (2006.01)
*B01D 29/50* (2006.01)

(52) U.S. Cl.
USPC ............ 210/167.04; 210/167.01; 210/167.31; 210/172.1; 210/172.2; 210/172.6; 210/323.1

(58) Field of Classification Search
USPC .................... 210/167.04, 172.1, 172.2, 323.1
See application file for complete search history.

(56) References Cited

U.S. PATENT DOCUMENTS

| | | | | |
|---|---|---|---|---|
| 4,794,883 | A * | 1/1989 | Fukami et al. | 123/41.12 |
| 5,101,936 | A | 4/1992 | Paredes et al. | |
| 5,200,067 | A * | 4/1993 | Sann | 210/172.2 |
| 6,539,912 | B1 | 4/2003 | Beer | |
| 2004/0007520 | A1 | 1/2004 | Beer | |
| 2006/0107837 | A1 | 5/2006 | Showalter et al. | |

FOREIGN PATENT DOCUMENTS

| | | | |
|---|---|---|---|
| EP | 1669119 | A1 | 6/2006 |
| WO | 01/63100 | A2 | 8/2001 |
| WO | 02/46584 | A1 | 6/2002 |

OTHER PUBLICATIONS

International Search Report dated Jun. 1, 2010.

* cited by examiner

*Primary Examiner* — Benjamin Kurtz
(74) *Attorney, Agent, or Firm* — Cheryl F. Cohen; Christa Hildebrand

(57) ABSTRACT

An oil container has a container housing receiving an oil filter and fittings for an oil inlet, an oil outlet, for filling the oil container, and for an opening that can be closed by a cover for temporarily removing or replacing the oil filter, as well as, an air outlet opening. The container housing is divided into at least two chambers by a partition, each chamber including an oil filter. Each chamber has an oil inlet fitting, an oil outlet fitting, and an opening that can be closed by a cover for filling with oil and/or for removing the oil filter. The partition includes an oil overflow opening located above a minimum oil filling level height relative to a rest state determined for the individual oil circuits. A leak occurring in one of the oil circuits does then not affect the operational reliability of the other oil circuit(s).

5 Claims, 2 Drawing Sheets

OIL TANK

Figure 1:
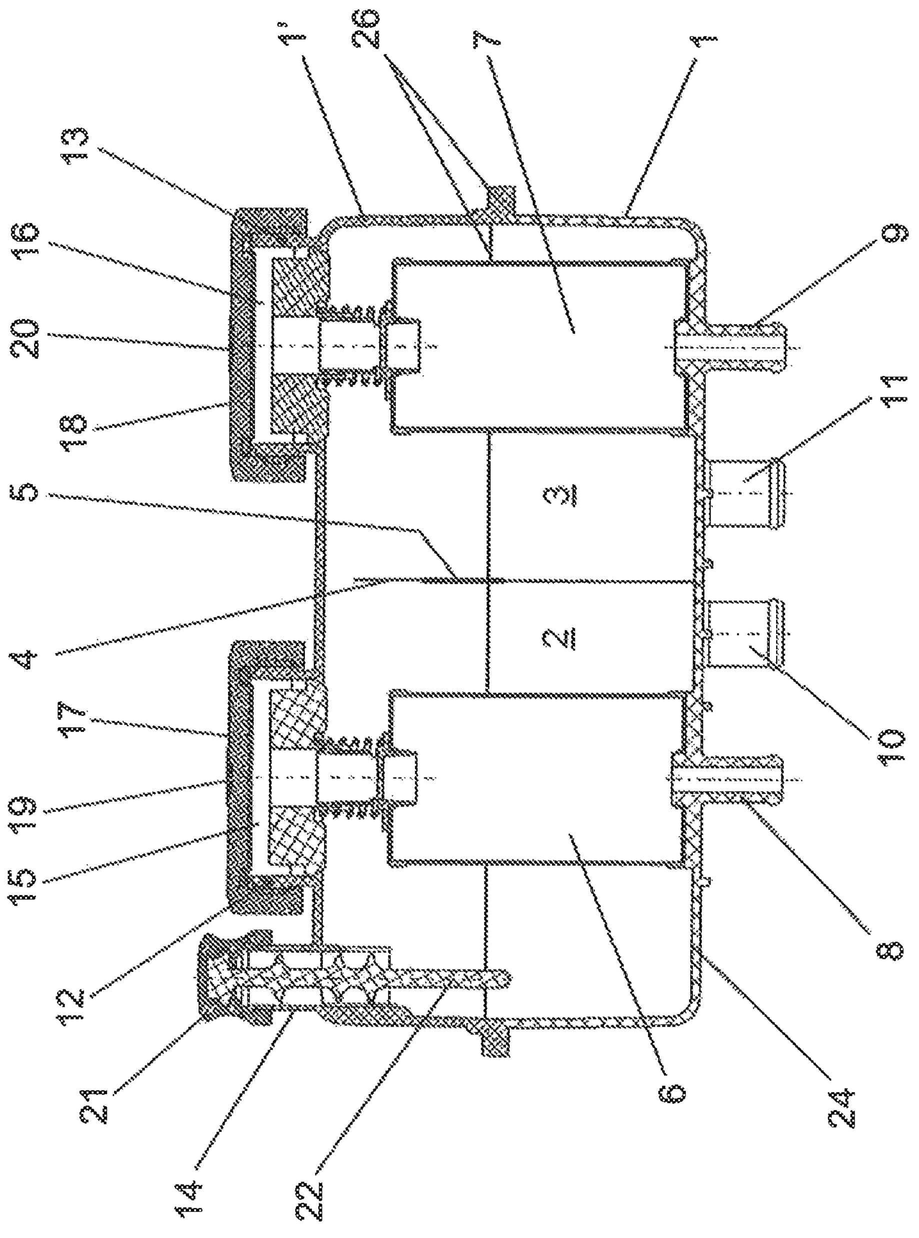

This is an application filed under 35 USC §371 of PCT/DE2010/050008, filed on Mar. 8, 2010, claiming priority to DE 10 2009 001 460.8 filed on Mar. 11, 2009.

BACKGROUND OF THE INVENTION (1) Field of the Invention

The invention relates to an oil container. It relates to a container for receiving an oil supply for an oil circuit and includes means for filtering the oil carried in the oil circuit.

(2) Description of Related Art

Oil containers of the aforedescribed type are employed particularly in motor vehicles, for example in the steering system as part of the hydraulic steering. Because the automotive industry is continuously striving to improve safety and comfort, particularly modern motor vehicles have typically a number of systems aided by hydraulics. Several oil circuits are therefore disposed in a vehicle, which require a container for storing the required oil and preferably means for filtering the oil. The filter means are partially integrated in the respective oil containers. Such oil container is disclosed, for example, in EP 1 669 119 A1.

According to the state of the art, separate oil containers for each oil circuit are arranged at suitable locations of the vehicle. This requires finding a suitable installation space among the other vehicle components. In addition, each hydraulic circuit must be separately serviced. Several locations or several oil containers must be filled with suitable oil when the systems are initially filled and whenever the vehicle is serviced. If in individual cases a composite hydraulic system is contemplated, then an additional line must be provided, thereby increasing the risk of leaks.

BRIEF SUMMARY OF THE INVENTION

It is an object of the invention to provide an oil container which obviates the aforementioned disadvantages. Use of this oil container should also make it easier to service and potentially also to initially fill the hydraulic systems. The object is attained with an oil container having the features of the independent claim. Advantageous embodiments or modifications of the invention are recited in the dependent claims.

The oil container proposed for solving the object includes a container housing constructed to receive oil filter means. For installation in a hydraulic system or hydraulic systems, fittings for the oil inlet, for the oil outlet, for filling the oil container and for an opening which can be closed with a cover for temporarily removing or exchanging the oil filter means are arranged on the container housing, as is known in the art. The oil container also includes, as known in the art, at least one air exit opening.

According to the invention, the container housing is divided into at least two separate chambers. To this end, at least one partition or, if divided into more than two chambers, several partitions are arranged in the container housing, The partition(s) is/are formed as a single section or as several sections. A corresponding oil filter which is integrated in the oil circuit is arranged in each chamber. In addition, the type and number of the aforementioned fittings on the container housing are configured so that each chamber has an oil inlet fitting, an oil outlet fitting and an opening, which can be closed with a cover, for filling with oil and/or removing the oil filter. The partition(s), which divides(s) the container housing into several chambers, also have an oil overflow opening located above a minimum oil filling level which is defined with respect to a rest state; the oil overflow opening interconnects the chambers which are separated from each other by the respective chamber partition.

According to the above remarks, the container housing can be divided into two or more chambers. Unless explicitly specified otherwise, the additional diagrams relate to an embodiment with two chambers which is particularly relevant for practical applications. However, the invention is not limited to a two-chamber system. With the invention which provides, on one hand, the partitions which divide the container housing into at least two chambers, and, on the other hand, the oil overflow opening disposed on each wall, at least two oil circuits or hydraulic circuits can be filled with oil from a single oil container, whereby the oil circuits are still implemented as separate circuits. It is of particular importance that the oil overflow opening is arranged above a minimum oil filling level of the oil circuits. In this way, a leak occurring in one of the oil circuits is unable to adversely affect the other circuit(s), at least not with respect to operational safety. In this case, the level of the filling level would be equalized via the aforementioned oil overflow opening only until the minimal oil filling level is reached. Thereafter, the oil filling level could decrease only in the particular chamber in the oil circuit where a leak occurs. By using an oil container constructed according to the invention with two chambers for a system of a motor vehicle which for safety reasons is designed with two oil circuits, the respective system can operate reliably even if one of the oil circuits has a leak, as is necessary for the safety of the occupants.

On the other hand, as mentioned above, all chambers of the oil container can be filled via a one or possibly several suitable openings or fittings when initially first or when serviced. Preferably, a fitting which can be closed by a closure in form of a collar or a cover is formed on the container housing in the region of at least one of the chambers. Preferably, means for measuring or controlling the oil filling level are advantageously arranged on the closure or on the fitting. This may be, for example, a rod connected with the cover, which protrudes into the respective chamber in form of an oil dipstick when the fitting is closed. Alternatively, noncontact sensors could also be used for this purpose. All chambers of the oil container can be filled with oil through the corresponding fitting or the corresponding opening; on the other hand, the oil filling level in the chambers can be determined with only a single measurement device. The latter applies, of course, only as long as the oil.filling level in one chamber does on fall below the minimum oil filling level, for example, due to leakage. If the oil filling level should be reliably determined for each chamber, then corresponding fittings with associated closure and measurement devices would have to be installed on each chamber.

According to a practical embodiment, the container housing of the oil container includes a housing bottom part, a housing top part which is materially or positively connected with the housing bottom part, wherein the housing bottom part and the housing top part are constructed as an injection molded part or a cast part. In this type of embodiment, the partition separating the chambers can be constructed in two sections, whereby a lower section of the partition is then integrally formed with the housing bottom part and a top section of this partition is integrally formed with the housing top part. The oil overflow opening is hereby formed by a gap that remains between the lower section and the upper section of the partition when the housing parts of the container housing are joined.

The oil container according to the invention can advantageously be modified by arranging inside the container housing one or more baffles for calming the oil received in the container. This prevents the oil received in the container from unintentionally building up in the container by forming waves caused by vibrations acting on the vehicle during operation. In the aforementioned embodiment with the two-section partition, the baffle, which extends parallel to the container bottom and horizontally in the installation position of the oil container, is preferably arranged on the lower boundary of the oil overflow opening, i.e., on the top side of the lower section of the partition which is in turn connected as a single piece with the housing bottom part. The baffle also protrudes into both chambers that are separated by the partition. According to a preferred embodiment, the baffle is constructed so that the end of the baffle has in at least one chamber a section which extends from the oil filter of the respective chamber approximately parallel to the partition. This rising section of the baffle prevents oil building up in the container, for example, due to external shaking or vibrations, from sloshing in form of a gusher into the respective oil filter that is protected by the rising section of the baffle.

The oil container according to the invention can be modified further by arranging in the container housing means for separating air bubbles entrained in the oil. The respective air then escapes through the aforementioned air exit opening. The latter is preferably arranged in the cover(s) used to close the fittings of the container housing which form respective service openings for refilling oil and/or for removing an oil filter for cleaning or exchanging an oil filter.

BRIEF DESCRIPTION OF THE SEVERAL VIEWS OF THE DRAWING(S)

Figure 2:
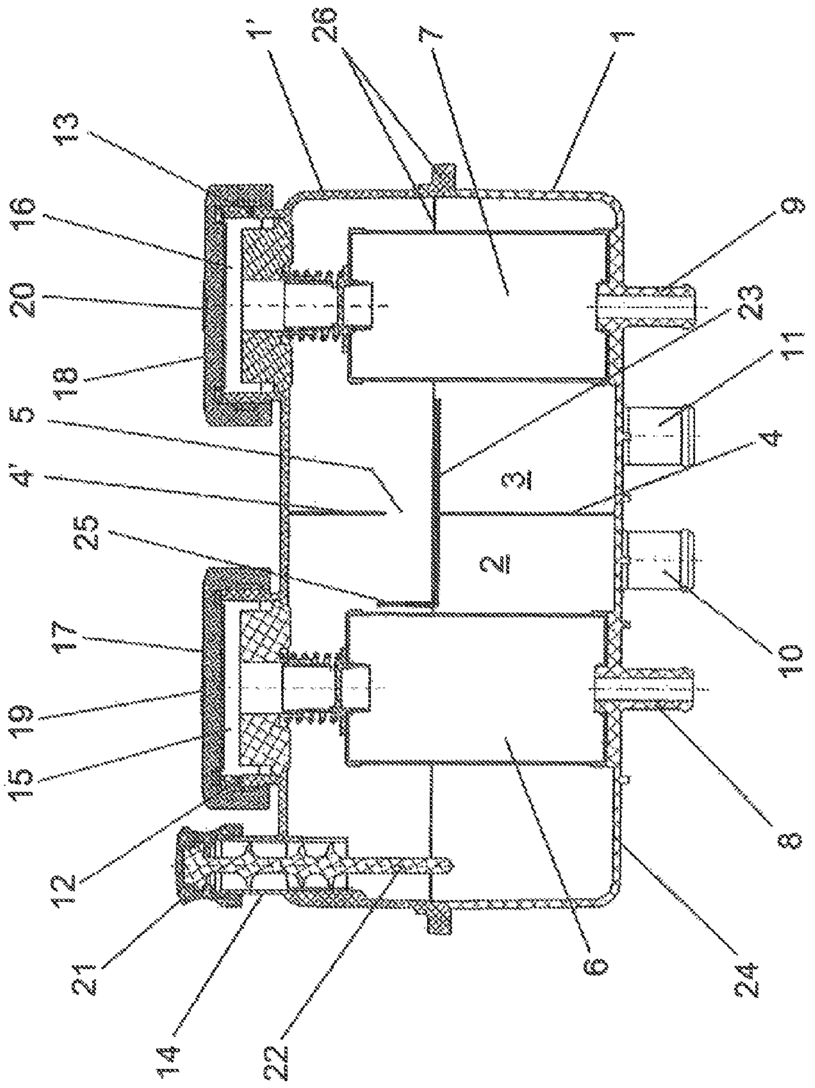

Exemplary embodiments of the invention will now be provided. The appended drawings show in:

FIG. 1 a possible embodiment of the oil container according to the invention, and FIG. 2 a slightly modified variant of the embodiment according to FIG. 1.

DETAILED DESCRIPTION OF THE INVENTION

FIG. 1 shows an exemplary embodiment of the oil container according to the invention in a cross-sectional view. The oil container includes a two-part container housing 1; 1', namely a housing bottom part 1 and a housing top part 1', which are connected with one another by a weld joint 26. According to the underlying concept of the invention, the container housing 1; 1' is divided into two chambers 2, 3 by a partition 4 which is arranged in the container housing 1; 1' and rises from the bottom of the housing bottom part. An oil inlet fitting 8, 9 and an oil outlet fitting 10, 11 connecting each chamber 2, 3 with an oil circuit are formed on the container housing 1; 1' for each of the two chambers 2, 3. An oil filter 6, 7 is arranged in each chamber 2, 3 above the oil inlet fitting 8, 9. Furthermore, a fitting 12, 13 for forming a service opening 15, 16 which can be closed by a cover 17, 18 is formed for each chamber 2, 3 above the respective oil filters 6, 7. The oil filters 6, 7 can be removed from the oil container through the corresponding opening 15, 16 for cleaning or exchange. Moreover, a respective hole operating as an air exit opening 19, 20 is disposed in each of the covers 17, 18 which close the service openings 15, 16. Oil can also be refilled through the service openings 15, 16, as is known for conventional containers. The initial filling is preferably performed through another dedicated fitting 14 on the left chamber in the Figure. The aforementioned fitting 14 is closed with a closure 21 in form of a cap, with an oil dipstick 22 being formed as an integral component of the cap projecting into the oil container.

An oil overflow opening 5, which is actually not visible in this view, but is diagrammatically indicated merely for purpose of illustration, is arranged in the partition 4 that separate the chambers 2, 3 from each other. The oil overflow opening 5 is located in the partition 4 at a height corresponding to a minimum filling level for the chambers 2, 3. When the left chamber 2 is filled through the fitting 14 and reaches the minimum filling level, the oil can flow over the oil overflow opening 5 into the right chamber 3, thus also filling this chamber 3 with oil. In the illustrated example, the partition 4 is formed as a single section, wherein as already explained an opening is provided in the partition 4 at a suitable height for forming the oil overflow opening 5. Alternatively, the partition 4 could also end at the height of the minimum oil filling level. However, extending the partition 4 above an opening for the oil overflow opening 5 advantageously calms the oil in the oil container somewhat, so that waves generated by vibrations associated with the operation do not surge from one chamber 2, 3 into the respective other chamber.

FIG. 2 shows, also in a cross-sectional view, a slightly modified variant of the oil container according to the invention of FIG. 1. The difference from the embodiment of FIG. 1 is that the partition 4; 4' is here formed in two sections. A lower section 4 of the partition 4; 4' is integrally connected with the housing bottom part 1 that is constructed, for example, as an injection molded part, whereas the upper section 4' of the partition 4; 4' is integrally formed with the housing top part 1'. The oil overflow opening 5 is implemented by a gap that remains between the two sections of the partition 4; 4' when the container housing 1; 1' is joined. In the embodiment illustrated in FIG. 2, an additional baffle 23 is arranged in the region of the oil overflow opening 5, which calms the oil moving in the chambers 2, 3, thereby preventing buildup of the oil. A section 25 of the baffle 23 which extends perpendicular or approximately parallel to the partition 4; 4' is arranged upstream of the oil filter 6.

LIST OF REFERENCE SYMBOLS

1, 1' Container housing
1 housing bottom part
1' housing top part
2, 3 Chamber
4,4' Partition
4 lower section
4' upper section
5 Oil overflow opening
6, 7 Oil filter means, oil filter
8, 9 Oil inlet fitting
10, 11 Oil outlet fitting
12, 13 Fitting
14 Fitting
15, 16 Opening
17, 18 Cover
19, 20 Air exit opening
21 Closure
22 Oil dipstick
23 Baffle
24 Container bottom
25 Section
26 Welded connection, weld seam

The invention claimed is:

1. An oil container with a container housing (1; 1') and with an oil filter (6, 7) received in the container housing (1; 1'), wherein fittings (8, 9, 10, 11, 12, 13, 14) for the oil inlet, for the oil outlet, for filling the oil container and for a corresponding opening (15, 16), which are closable by a cover (17, 18) for temporarily removing or exchanging the oil filter (6, 7), are arranged on the container housing, and wherein the oil container has at least one air exit opening (19, 20), wherein the container housing (1; 1') is divided into at least two separate chambers (2, 3) by a partition (4; 4') formed as a single section or as several sections, with the oil filter (6, 7) integrated in the oil circuit being arranged in each of the chambers (2, 3), and wherein the chambers (2, 3) have each at least one oil inlet fitting (8, 9), an oil outlet fitting (10, 11) as well as fittings (12, 13) with an opening (15, 16) which can be closed by a cover (17, 18) for filling with oil and/or for removing the oil filter (6, 7), wherein the partition (4; 4') comprises an oil overflow opening (5) which connects the chambers (2, 3) with one another and is located above a predefined minimum oil filling level for the oil circuits, in relation to a rest state;

wherein one or more baffles (23) are arranged in the container housing (1; 1') for calming the oil received by the container; wherein one of the baffles (23) extends parallel to the container bottom (24) and horizontally in the mounting position of the oil container resting on a lower boundary of the oil overflow opening (5) of the partition (4; 4') connected to the baffle (23) and protrudes into both chambers (2, 3) which are separated by the partition (4, 4').

2. The oil container according to claim 1, wherein a fitting (14), which can be closed with a closure (21) in form of a collar or a cover, is formed on the container housing (1; 1') in the region of at least one of the chambers (2, 3), wherein means (22) for measuring and/or controlling the oil filling level are arranged on the closure (21).

3. The oil container according to claim 1, wherein the container housing (1; 1') is constructed of a housing bottom part (1) and a housing top part (1') which is materially or positively connected with the housing bottom part (1), wherein the housing bottom part (1) and the housing top part (1') are formed as injection molded part or as cast part, wherein at least one lower section (4) of the partition (4; 4') separating the chambers (2, 3) is integrally formed with the housing bottom part (1) and a top section (4') of the partition (4; 4') is integrally formed with the housing top part (1'), and wherein the oil overflow opening (5) is formed by a gap remaining between the lower section (4) and the upper section (4') of the partition (4; 4')where the housing parts of the container housing (1; 1') are joined.

4. The oil container according to claim 1, wherein the baffle (23) which protrudes into the two chambers (2, 3) comprises an end with a section (25) disposed in at least one chamber (2) and rising approximately parallel to the partition (4; 4') before the oil filter (6) of the respective chamber (2).

5. The oil container according to claim 1, wherein the oil filter (6, 7) is arranged in each of the chambers (2, 3) above the oil inlet fittings (8, 9).

* * * * *